United States Patent
Whitlow et al.

(10) Patent No.: US 6,360,560 B1
(45) Date of Patent: Mar. 26, 2002

(54) CONDENSER WITH INTEGRAL RECEIVER DRYER

(75) Inventors: Greg Whitlow, Whitmore Lake; Ramchandra L Patel, Southgate; William Melnyk, Lathrup Village; Wen Fei Yu, Ann Arbor, all of MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/451,897

(22) Filed: Dec. 1, 1999

(51) Int. Cl.[7] ............................................. F25B 39/04
(52) U.S. Cl. ................................................. 62/509
(58) Field of Search .................... 62/509, 507, 498, 62/115, 401, 467, 332, 335; 417/902; 418/211

(56) References Cited

U.S. PATENT DOCUMENTS

| | | | |
|---|---|---|---|
| 5,088,294 A | * | 2/1992 | Ando ............................ 62/119 |
| 5,172,758 A | * | 12/1992 | Aoki ............................ 165/110 |
| 5,190,101 A | | 3/1993 | Jalilevand et al. |
| 5,228,315 A | * | 7/1993 | Nagasaka et al. ............. 62/509 |
| 5,379,833 A | * | 1/1995 | Mathews ...................... 165/110 |
| 5,394,710 A | * | 3/1995 | Matsuo et al. ................ 62/509 |
| 5,537,839 A | | 7/1996 | Burk et al. |
| 5,546,761 A | | 8/1996 | Matsuo et al. |
| 5,592,830 A | * | 1/1997 | Baba et al. .................... 62/509 |
| 5,666,791 A | | 9/1997 | Burk |
| 5,713,217 A | * | 2/1998 | Baba ............................ 62/509 |
| 5,868,002 A | * | 2/1999 | Matsubayashi ............... 62/507 |
| 5,896,754 A | * | 4/1999 | Balthazard et al. ........... 62/507 |
| 6,044,649 A | * | 4/2000 | Numoto et al. ............... 62/114 |
| 6,085,529 A | * | 7/2000 | Galus et al. ................... 62/93 |
| 6,182,744 B1 | * | 2/2001 | Nakamura et al. .......... 165/140 |
| 6,260,379 B1 | * | 7/2001 | Manwill et al. ............... 62/509 |

FOREIGN PATENT DOCUMENTS

EP  0 886 113 A2  6/1998

* cited by examiner

*Primary Examiner*—Teresa Walberg
*Assistant Examiner*—Daniel Robinson
(74) *Attorney, Agent, or Firm*—Brinks Hofer Gilson & Lione

(57) ABSTRACT

A condenser includes a plurality of generally U-shaped fluid carrying tubes having free ends and a manifold matingly engaging the free ends of the tubes and having an interior chamber. The manifold includes a receiver dryer disposed in the interior chamber and having a first fluid conduit wall and a second conduit wall extending axially to form a generally parallel first fluid passageway and second fluid passageway in fluid communication with the tubes and a dryer capsule being disposed in the interior chamber to dry fluid in the manifold.

20 Claims, 5 Drawing Sheets

CONDENSER WITH INTEGRAL RECEIVER DRYER

BACKGROUND OF THE INVENTION

1. Field of the Invention

The present invention relates generally to air conditioning systems for motor vehicles and, more specifically, to a condenser with an integral receiver dryer for an air conditioning system in a motor vehicle.

2. Description of the Related Art

It is known to provide a condenser for an air conditioning system in a motor vehicle. The condenser typically receives a fluid such as a refrigerant in a vapor phase, at a reasonably high temperature, and cools the vapor phase to transform it to a liquid phase. The condenser normally includes a plurality of generally U-shaped tubes having free ends matingly engaging a manifold. The condenser also includes a plurality of cooling fins disposed between the tubes. One type of condenser, often referred to as a multi-pass condenser, includes a plurality of baffles placed in the manifold to direct the refrigerant through a plurality of flow paths. As the refrigerant flows in a back and forth pattern through the condenser, heat is transferred from the vapor phase of the refrigerant to condense to the liquid phase. The liquid phase continues to flow through the tubes of the condenser until it reaches an outlet where it is drawn off and used in the air conditioning system. When both liquid and vapor phases are present, continued flow of the liquid phase through the tubes decreases the overall efficiency of the condenser as the vapor phase is hindered from contacting and transferring heat to the tubes. Further, the liquid phase of the refrigerant occupies space within the tubes, thus reducing available interior surface area for heat transfer.

It is also known to provide a separate receiver dryer for storage of excess refrigerant from the condenser and to remove any moisture from the refrigerant in the air conditioning system. An example of a separate receiver dryer for a condenser in an air conditioning system is disclosed in U.S. Pat. No. 5,755,113. In this patent, a separate receiver dryer fluidly communicates with a condenser. The receiver dryer includes a fluid inlet for receiving a two-phase refrigerant mixture from the condenser and two outlets, both of which direct refrigerant back to the condenser after phase separation. The receiver dryer also includes a quantity of desiccant material to remove moisture from the two-phase refrigerant mixture.

Other examples of receiver dryers used with condensers are disclosed in U.S. Pat. Nos. 5,537,839, 5,546,761 and 5,666,791. However, these receiver dryers utilize separate containers, which are attached to a header or manifold of the condenser by various means. In some cases, the attached containers do not contain the dryer material. Since the receiver dryer is a separate part, it requires additional space, fittings and brackets to attach it to the air conditioning system.

Although the above receiver dryers have worked well, it is desirable to incorporate a receiver dryer into a condenser. It is also desirable to incorporate a receiver dryer into a manifold of a condenser. It is further desirable to provide a condenser with a receiver dryer having fewer parts and compact installation.

SUMMARY OF THE INVENTION

Accordingly, the present invention is a condenser including a plurality of generally U-shaped fluid carrying tubes having free ends and a manifold matingly engaging the free ends of the tubes and having an interior chamber. The manifold includes a receiver dryer disposed in the interior chamber and having a first fluid conduit wall and a second conduit wall extending axially to form a generally parallel first fluid passageway and second fluid passageway in fluid communication with the tubes and a dryer capsule being disposed in the interior chamber to dry fluid in the manifold.

One advantage of the present invention is that a condenser with an integral receiver dryer is provided for an air conditioning system of a motor vehicle. Another advantage of the present invention is that the condenser has the receiver dryer incorporated into a manifold of the condenser that has been increased in diameter. Yet another advantage of the present invention is that the condenser has an integral receiver dryer in the manifold which has fewer parts and compact installation. Still another advantage of the present invention is that the condenser includes a relatively large manifold and dryer material disposed therein that performs as an integral receiver dryer. A further advantage of the present invention is that the condenser includes a relatively large manifold that creates a chamber capable of housing the dryer material and acting as a receiver. Yet a further advantage of the present invention is that the condenser includes a relatively large manifold with a one-piece or two-piece extruded construction. Still a further advantage of the present invention is that the condenser includes a relatively large manifold with a stamped construction.

Other features and advantages of the present invention will be readily appreciated, as the same becomes better understood after reading the subsequent description taken in conjunction with the accompanying drawings.

DESCRIPTION OF THE PREFERRED EMBODIMENT(S)

Figure 1:
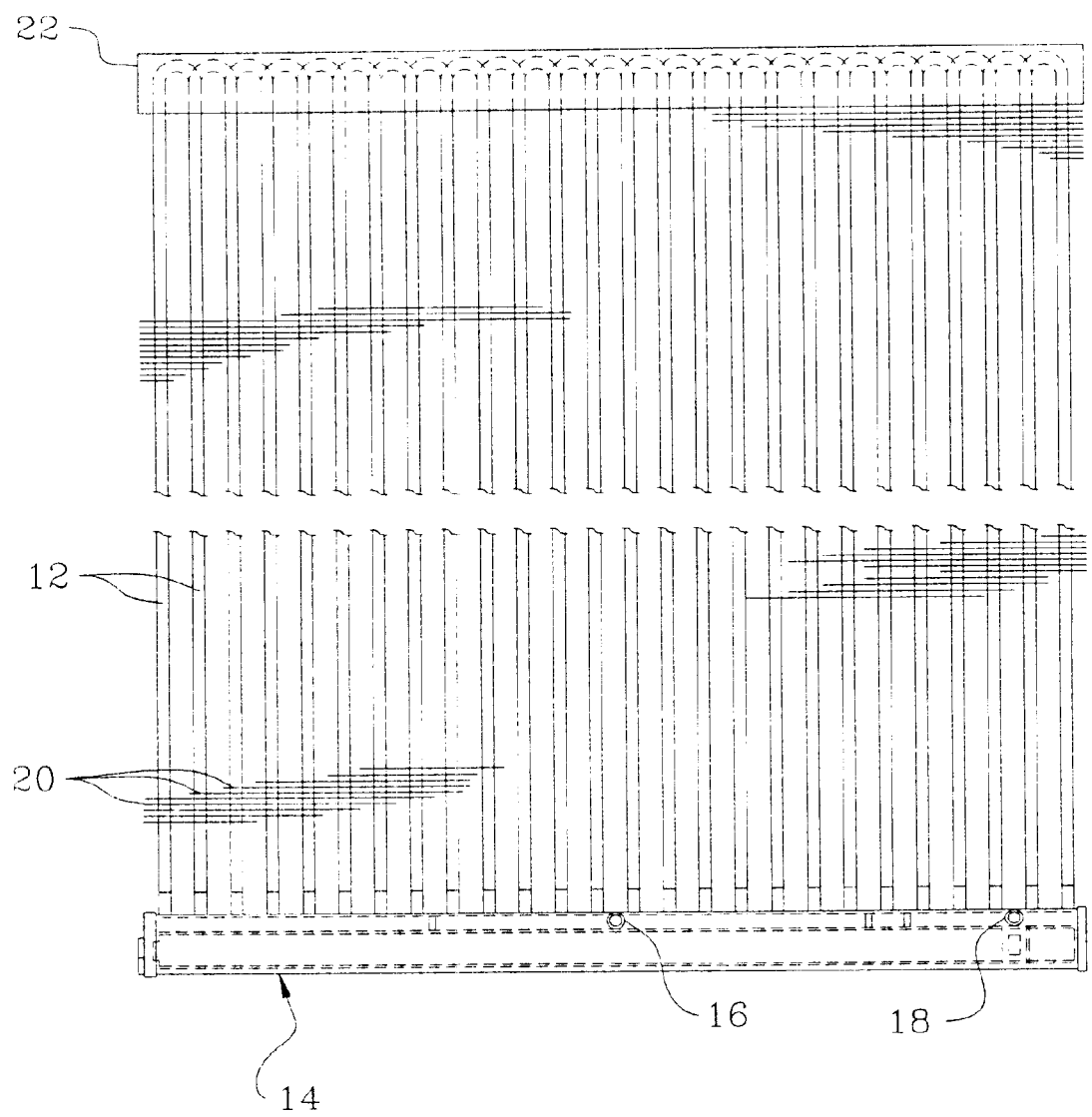
FIG. 1 is an elevational view of a condenser with an integral receiver dryer, according to the present invention.

Referring to the drawings and in particular FIG. 1, one embodiment of a condenser 10, according to the present invention, is shown for an air conditioning system (not shown) in a motor vehicle (not shown). The condenser 10 includes a plurality of generally U-shaped tubes 12 having free ends matingly engaging a manifold, generally indicated at 14 and according to the present invention, disposed at one end of the condenser 10. The condenser 10 includes a fluid inlet 16 for directing the fluid into the condenser 10 formed in the manifold 14 and a fluid outlet 18 for directing the fluid out of the condenser 10 formed in the manifold 14. The condenser 10 also includes a plurality of elongated heat dissipative fins 20 interposed between each of the tubes 12 at regularly spaced intervals relative to one another and attached to an exterior of each of the tubes 12. The fins 20 serve as a means for conducting heat away from the tubes 12 while providing additional surface area for convective heat transfer by air flowing over the condenser 10. The condenser 10 includes at least one support member 22 such as an end sheet. The support member 22 is a generally U-shaped having a planar base portion and a pair of flanges extending perpendicularly therefrom. The support member 22 includes a plurality of tube-receiving apertures therein. The support member 22 supports the tubes 12 and can further be utilized as attachment means for attaching the condenser 10 to the motor vehicle. It should be appreciated that the support member 22 is conventional and known in the art. It should also be appreciated that the condenser 10 is of a six-millimeter (6-mm) type as is known in the art. It should further be appreciated that the condenser 10 could be used as a heat exchanger in other applications besides motor vehicles.

Figure 2:
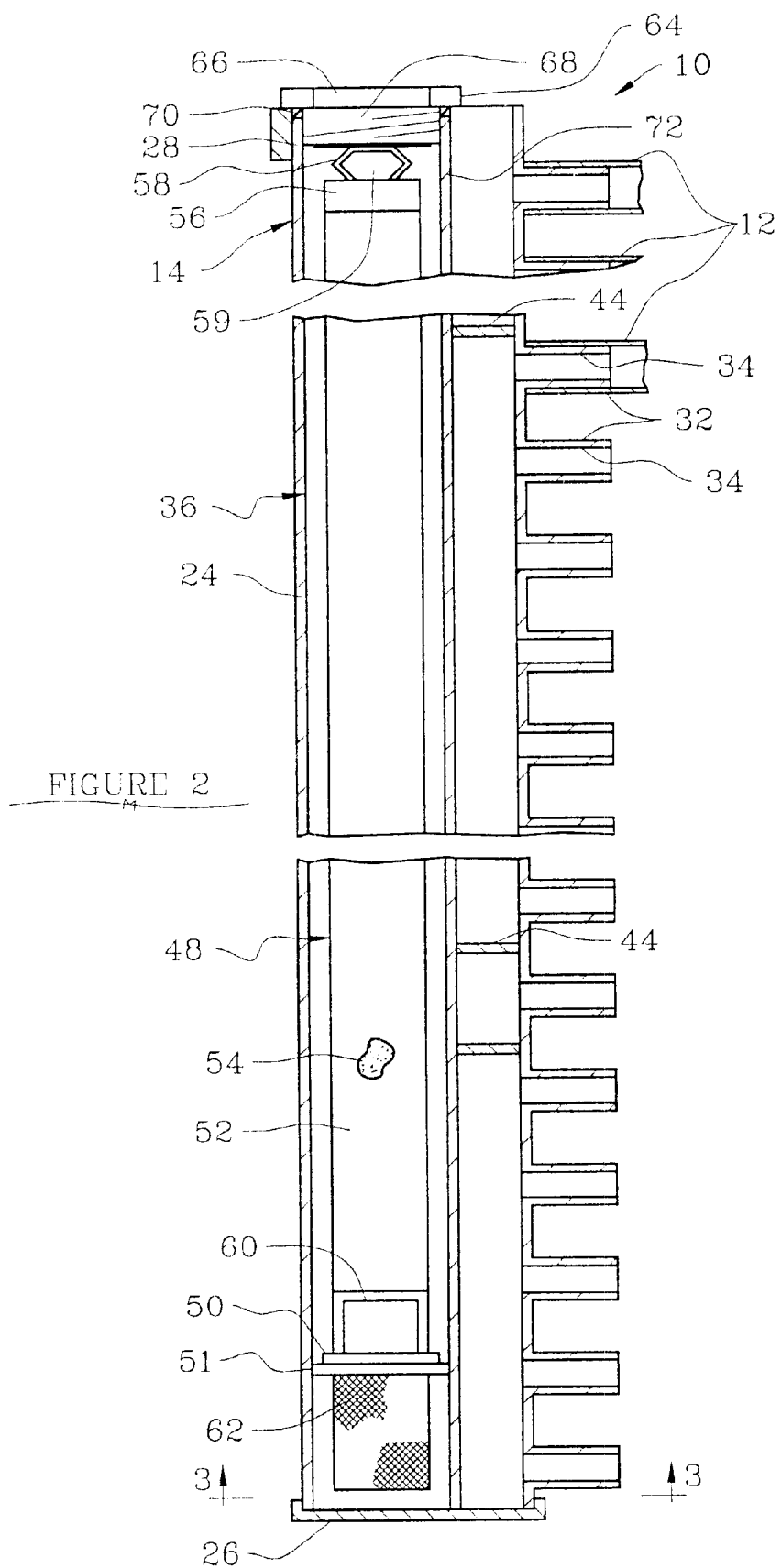
FIG. 2 is an enlarged fragmentary view of the condenser with integral receiver dryer of FIG. 1.
Figure 3:
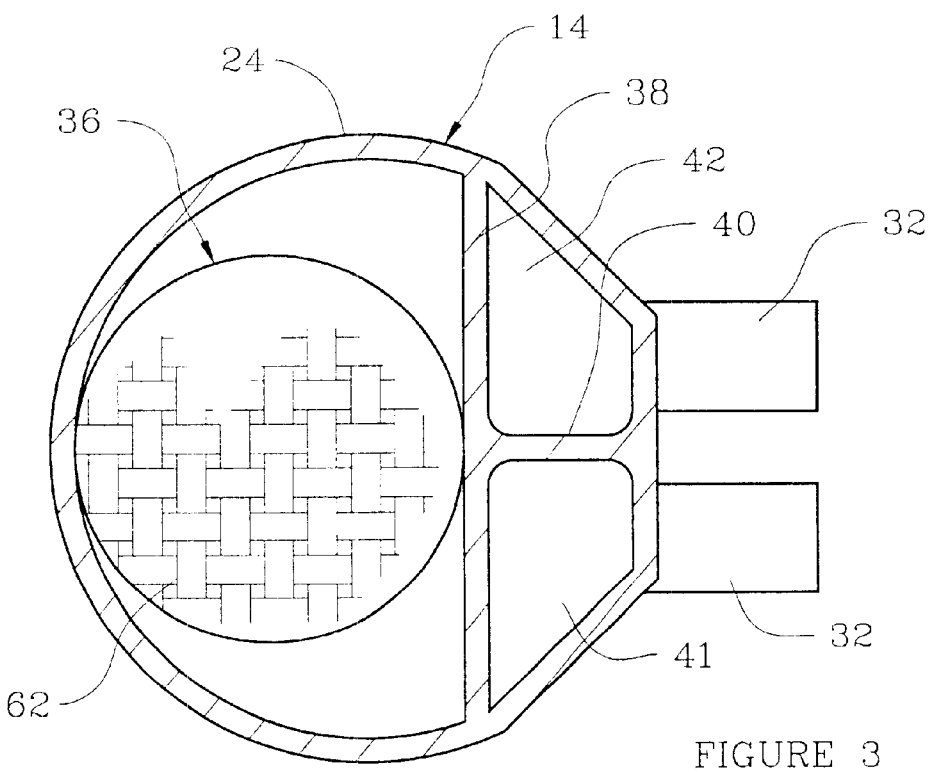
FIG. 3 is a sectional view taken along line 3—3 of FIG. 2.

Referring to FIGS. 1 through 3, the manifold 14 is generally cylindrical in shape with a generally circular cross-sectional shape. The manifold 14 is made of a metal material such as aluminum. The manifold 14 has a side 24 extending axially, a closed end 26 at a bottom thereof and an open end 28 at a top thereof to form an interior chamber 30. The open end 28 is threaded for a function to be described. The side 24 has a plurality of tubular members 32 extending radially therefrom and spaced axially to receive one end of the tubes 12. The tubular members 32 have a fluid conducting passageway 34 extending therethrough. It should be appreciated that the tubes 12 are secured to the tubular members 32 by suitable means such as brazing.

The condenser 10 also includes an integral receiver dryer, generally indicated at 36, disposed in the manifold 14. The receiver dryer 36 includes a first fluid conduit wall 38 disposed in the interior chamber 30 to divide the interior chamber 30. The first fluid conduit wall 38 extends axially and radially across the interior chamber 30. The receiver dryer 36 also has a second fluid conduit wall 40 extending axially and radially between the first fluid conduit wall 38 and the side 24. The first fluid conduit wall 38 and second fluid conduit wall 40 form a general "T" shape and a front or first fluid conduit or passageway 41 and a rear or second fluid conduit or passageway 42. The first fluid passageway 41 and second fluid passageway 42 have a generally trapezoidal cross-sectional shape. The first fluid passageway 41 fluidly communicates with the fluid inlet 16 and fluid outlet 18. The first fluid conduit wall 38 and second fluid conduit wall 40 are made of a metal material such as aluminum. The side 24, first fluid conduit wall 38 and second fluid conduit wall 40 are extruded to form a single extrusion by conventional extruding processes. It should be appreciated that the side 24, first fluid conduit wall 38 and second fluid conduit wall 40 are integral, unitary and formed as one-piece.

The receiver dryer 36 also includes at least one, preferably a plurality of baffles 44 and 46 disposed in the first fluid passageway 41 and second fluid passageway 42 to direct fluid in and out of the manifold 14. The baffles 44 are generally planar and circular in shape. One of the baffles 44 is located axially between the fluid inlet 16 and fluid outlet 18 in the first fluid passageway 41. Another one of the baffles 44 is located axially between the fluid inlet 16 and the open end 28 in the first fluid passageway 41. One of the baffles 46 is located axially between the fluid inlet 16 and fluid outlet 18 in the second fluid passageway 42. The baffles 44 are made of a metal material such as aluminum. The baffles 44 and 46 are secured to the first fluid conduit wall 38, second fluid conduit wall 40 and side 24 by suitable means such as brazing. It should be appreciated that the baffles 44 are integral with the manifold 14.

The receiver dryer 36 includes a dryer capsule, generally indicated at 48, disposed in the interior chamber 30 of the manifold 14 to remove moisture from the fluid. The dryer capsule 48 is generally cylindrical in shape with a circular cross-section. The capsule 48 includes a base 50 that is generally circular in shape. The base 50 is disposed adjacent a seat wall 51 to create a seal and prevent fluid from passing therebetween. The seat wall 51 is generally planar and annular in shape and has an aperture extending therethrough for a function to be described. The seat wall 51 is made of a metal material such as aluminum and secured to the side 24 and first fluid conduit wall 38 by suitable means such as brazing.

The dryer capsule 48 also includes a housing 52 extending axially from the base 50 and is generally cylindrical and tubular in shape. The housing 52 may have a plurality of apertures (not shown) extending therethrough and a filter (not shown) covering the apertures. The dryer capsule 48 includes a quantity of dryer material 54 such as desiccant disposed within the housing 52. It should be appreciated that the dryer material 54 may also be contained in a dryer bag (not shown).

The dryer capsule 48 includes a cap 56 closing the end of the housing 52. The cap 56 may have a loop 58 with an aperture 59 extending therethrough to allow a tool (not shown) to engage the loop 58 to remove the dryer capsule 48 from the manifold 14. The cap 56 also allows desiccant to be replaced in the housing 52. The loop 58 also acts as a spring to hold the base 50 of the dryer capsule 48 against the seat wall 51 when an end closure 64 to be described is in place over the open end 28.

The dryer capsule 48 also has a plurality of apertures 60 extending radially through the base 50. The dryer capsule 48 includes a filter 62 such as a screen extending axially from the base 50 and through the aperture in the seat wall 51. The filter 62 has a generally cylindrical shape to filter out particles in the fluid. The base 50, housing 52 and filter 62 are made of a rigid material such as plastic and are integral, unitary and formed as one-piece. It should be appreciated that the dryer material 54 is conventional and known in the art.

The manifold 14 also includes an end closure 64 for closing the open end 28 thereof. The end closure 64 has a head 66 extending radially and a threaded shaft 68 extending axially. The end closure 64 may include a seal 70 disposed about the threaded shaft 68 and adjacent the head 66. The threaded shaft 68 engages the threaded open end 28 such that the seal 70 engages the side 24 and the head 66 overlaps the side 24. The end closure 64 is made of a metal material such as aluminum and the seal 70 is made of an elastomeric material such as rubber. It should be appreciated that the end closure 64 is removable to allow the dryer capsule 48 to be replaced. It should also be appreciated that the dryer capsule 48 is inserted into the manifold 14 after the manifold 14 is brazed and before the end closure 64 is in place.

In operation, fluid from the air conditioning system enters the condenser 10 through the fluid inlet 16 on the manifold 14. The fluid enters the first fluid passageway 41 and the baffles 44 direct or route the fluid through a first pass of twelve (12) tubes 12 and a second pass of twelve (12) tubes 12 into the second fluid passageway 42. The fluid flows into an upper pass of eight (8) tubes 12 and into the first fluid passageway 41 of eight (8) tubes 12 of the condenser 10. The fluid flow enters the interior chamber 30 through a single opening 72 in the first fluid conduit wall 38 at a top thereof. The fluid flows along the side 24 and first fluid conduit wall 38, creating a circular motion around the dryer capsule 48, thus separating the dense liquid from any non-condensed gas. The dense liquid drops to the apertures 60 in the base 50, through the apertures 60 and to the filter 62. The fluid then flows through the second fluid passageway 42 and the baffle 46 directs the fluid to a first pass of five (5) tubes 12 of a subcooling loop. The condensed liquid fluid reverses and passes through a second pass of five (5) tubes 12 of the subcooling loop, into the first fluid passageway 41 and through the fluid outlet 18 and on to an evaporator (not shown) of the air conditioning system. It should be appreciated that the number of tubes 12 per pass or loop may be varied.

Figure 4:
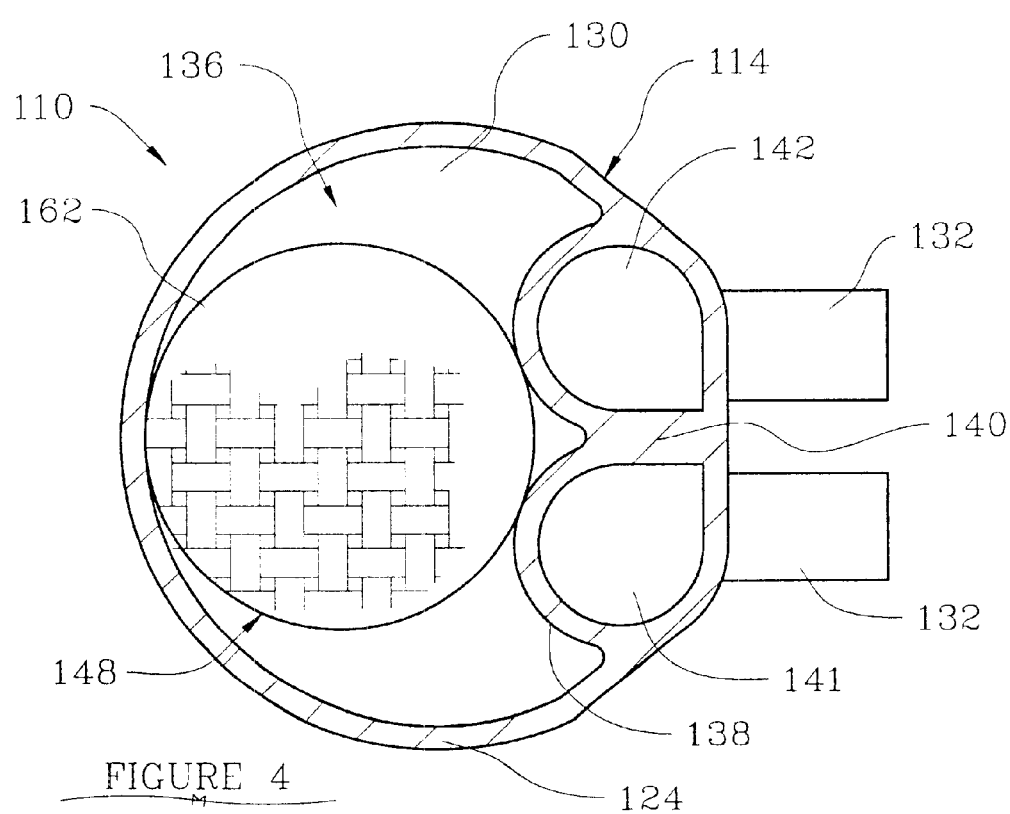
FIG. 4 is a view similar to FIG. 3 of another embodiment, according to the present invention, of the condenser with integral receiver dryer of FIG. 1.

Referring to FIG. 4, another embodiment 110, according to the present invention, is shown for the condenser 10. Like parts of the condenser 10 have like reference numerals increased by one hundred (100). In this embodiment, the first fluid conduit wall 138 and the second fluid conduit wall 140 of the receiver dryer 136 are formed generally arcuate in shape and merged together to form the first fluid passageway 141 and second fluid passageway 142. The first fluid passageway 141 and second fluid passageway 142 are generally circular in cross-sectional shape. The condenser 110 includes the dryer capsule 148 disposed in the interior chamber 130 of the manifold 114. The side 124, first fluid conduit wall 138 and second fluid conduit wall 140 are formed as an extrusion from a metal material such as aluminum by conventional extruding processes and are integral, unitary and one-piece. It should be appreciated that the condenser 110 operates similar to the condenser 10.

Figure 5:
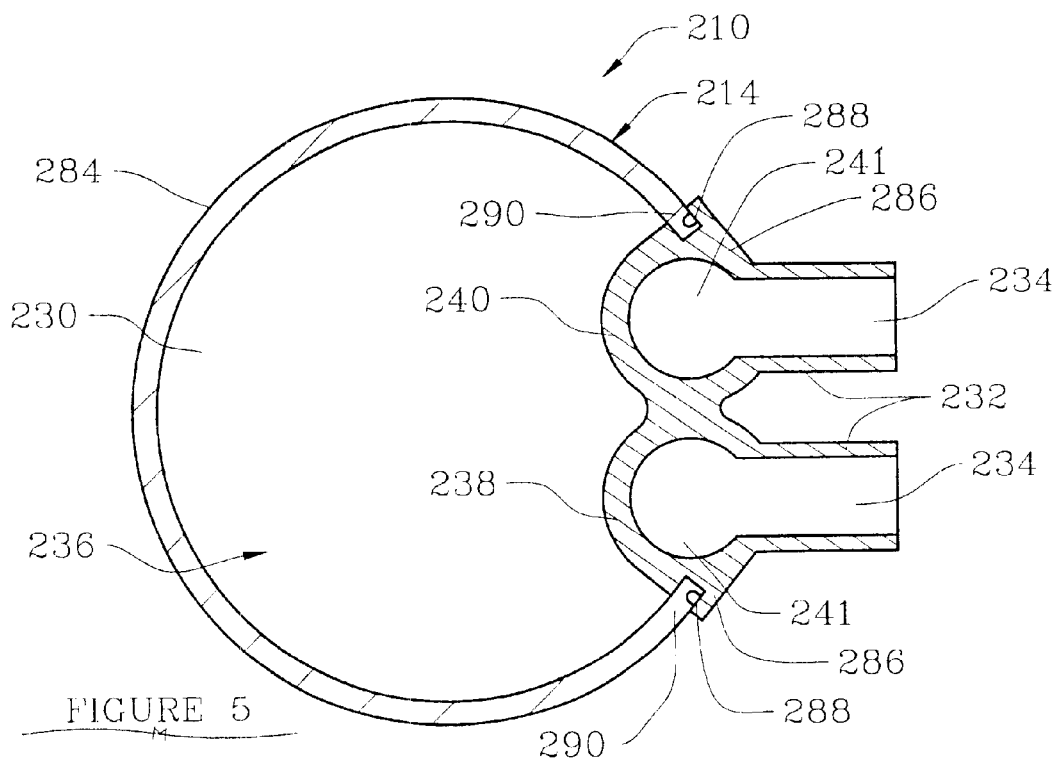
FIG. 5 is a view similar to FIG. 3 of yet another embodiment, according to the present invention, of the condenser with integral receiver dryer of FIG. 1.

Referring to FIG. 5, yet another embodiment 210, according to the present invention, is shown for the condenser 10. Like parts have like reference numerals increased by two hundred (200). In this embodiment, the manifold 214 is a split manifold having a two-piece housing. The manifold 214 includes a first housing 282 and a second housing 284. The first housing 282 includes the first fluid conduit wall 238 and the second fluid conduit wall 240 of the receiver dryer 236. The first fluid conduit wall 238 and the second fluid conduit wall 240 are formed generally arcuate in shape and merged together to form the first fluid passageway 241 and second fluid passageway 242. The first fluid passageway 241 and second fluid passageway 242 are generally circular in cross-sectional shape. The first housing 282 also includes the tubular members 232 extending radially therefrom and spaced axially to receive one end of the tubes 12. The tubular members 232 have the fluid conducting passageways 234 extending therethrough and fluidly communicating with the first and second fluid passageways 241 and 242. The first housing 282 also includes a pair of flanges or wings 286 on sides thereof spaced radially and extending outwardly with a slot 288 extending axially therealong for a function to be described. The slots 288 are either milled or broached into the wings 286. The first housing 282 is made of a metal material and formed as a single extrusion by conventional extruding processes.

The second housing 284 extends axially and circumferentially. The second housing 284 is generally arcuate in shape and has side edges 290 to be disposed in the slots 288 of the first housing 284. The second housing 282 is made of a metal material such as aluminum and formed as a single extrusion by conventional extrusion processes. It should be appreciated that a staking operation would be added to hold the second housing 284 and first housing 282 together during a brazing operation. It should also be appreciated that the manifold 214 allows for ease of manufacturing. It should further be appreciated that the condenser 210 operates similar to the condenser 10.

Figure 6:
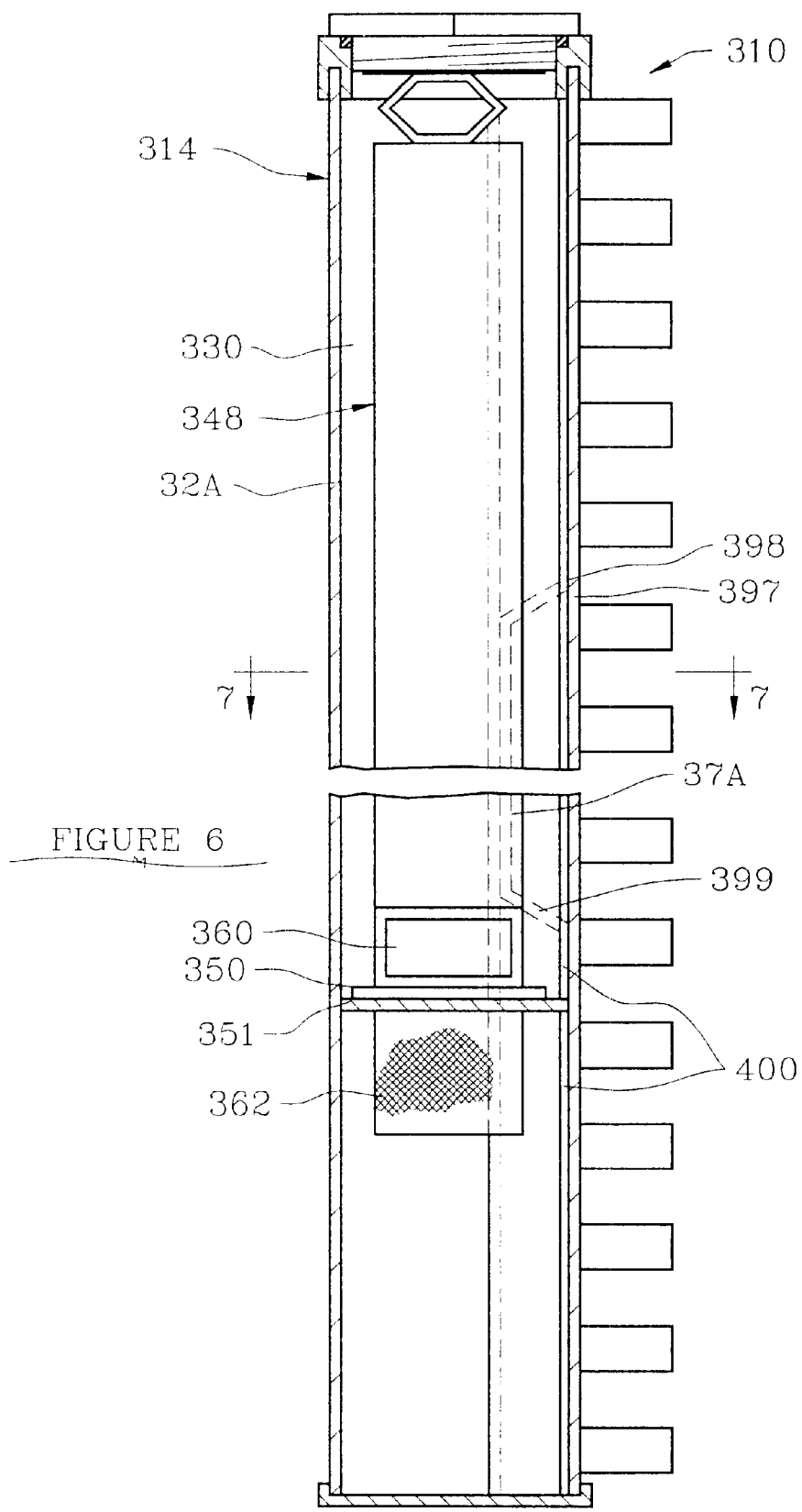
FIG. 6 is an enlarged fragmentary view of still another embodiment, according to the present invention, of the condenser with integral receiver dryer of FIG. 1.
Figure 7:
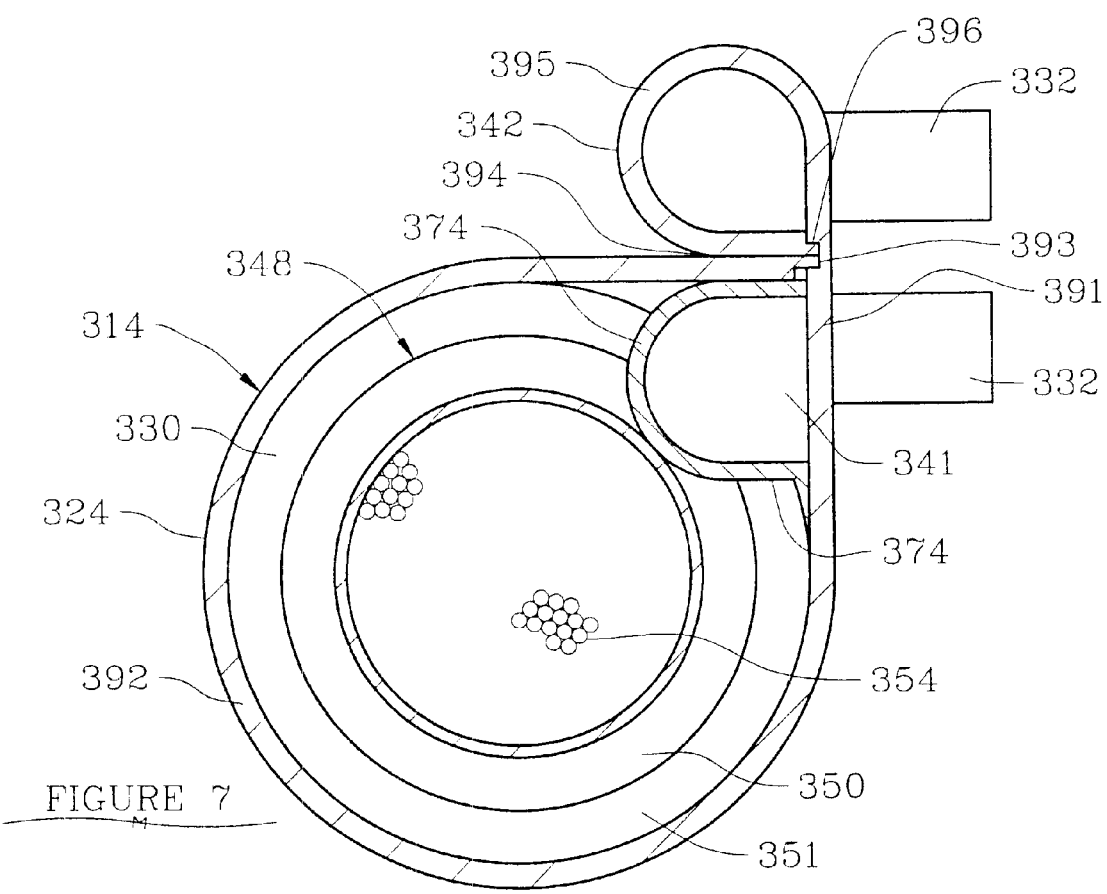
FIG. 7 is a sectional view taken along line 7—7 of FIG. 6.

Referring to FIGS. 6 and 7, still another embodiment 310, according to the present invention, is shown for the condenser 10. Like parts of the condenser 10 have like reference numerals increased by three hundred (300). In this embodiment, the manifold 314 is of a stamped sheet metal construction. The manifold 314 includes the side 324 having a planar portion 391 and an arcuate portion 392. The planar portion 391 has a slot 393 extending axially to receive a side edge 394 of the arcuate portion 392 to form the interior chamber 330. The side 324 also has a passageway portion 395 extending from the planar portion 391 and being arcuate in shape with a side edge 396 disposed in the slot 393 to form the second fluid passageway 342. The planar portion 391 and passageway portion 395 include includes the tubular members 332 extending radially therefrom and spaced axially to receive the free ends of the tubes 12. The tubular members 332 have the fluid conducting passageways (not shown) extending therethrough and fluidly communicating with the first and second fluid passageways 341 and 342. The manifold 314 also includes a flow deflector 374 of the receiver dryer 336. The flow deflector 374 extends axially and is generally arcuate in shape to form the first fluid passageway 341. The flow deflector 374 has a first or upper end 397 extending radially and axially at an angle. The upper end 397 has a flange 398 extending axially and secured to the planar portion 391 by suitable means such as brazing. The flow deflector 374 has a second or lower end 399 extending radially and axially at an angle. The lower end 399 has a flange 400 extending axially and secured to the planar portion by suitable means such as brazing. The flow deflector 374 forms the first fluid passageway 241 and acts as a baffle similar to the baffles 44 to direct fluid through the tubes 12 of the condenser 310. The flow deflector 374 is made of a metal material such as aluminum with cladding on one side thereof. It should be appreciated that the planar portion 391 may have raised dimples (not shown) extending through apertures (not shown) in the flanges 398 and 400 that are coined to lock the flow deflector 374 in place prior to brazing. It should also be appreciated that the flow deflector 374 is integral with the manifold 314. It should further be appreciated that the condenser 310 operates similar to the condenser 10.

The present invention has been described in an illustrative manner. It is to be understood that the terminology which has been used is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A condenser comprising:

a plurality of generally U-shaped fluid carrying tubes having free ends;

a manifold matingly engaging said free ends of said tubes and having an interior chamber; and said manifold including a receiver dryer disposed in said interior chamber and having a first fluid conduit wall and a second conduit wall extending axially to form a generally parallel first fluid passageway and second fluid passageway in fluid communication with said tubes and a dryer capsule being disposed in said interior chamber to dry fluid in said manifold.

2. A condenser as set forth in claim 1 wherein said first fluid conduit wall and said second fluid conduit wall are extruded as one-piece.

3. A condenser as set forth in claim 1 including a plurality of baffles positioned within said first fluid passageway and said second fluid passageway and cooperating with said tubes to form a plurality of fluid flow passes, each flow pass having a plurality of said tubes associated therewith.

4. A condenser as set forth in claim 1 wherein said first fluid passageway and said second fluid passageway have a generally trapezoidal cross-sectional shape.

5. A condenser as set forth in claim 1 wherein said first fluid passageway and said second fluid passageway have a generally circular cross-sectional shape.

6. A condenser as set forth in claim 1 wherein said manifold comprises a plurality of housings.

7. A condenser as set forth in claim 6 wherein said housings comprise a first housing and a second housing.

8. A condenser as set forth in claim 6 wherein said first housing has a pair of slots and said second housing has a pair of side edges to be received in said slots.

9. A condenser as set forth in claim 1 wherein said dryer capsule includes a dryer material disposed in said capsule.

10. A condenser as set forth in claim 9 wherein said dryer capsule comprises a base, a housing extending from said base to house said dryer material, at least one aperture extending through said base and a filter extending from said base and fluidly communicating with said at least one aperture.

11. A condenser as set forth in claim 1 wherein said receiver dryer includes a flow deflector forming one of said first fluid conduit wall and said second fluid conduit wall and secured to said manifold to direct fluid into said tubes.

12. A condenser as set forth in claim 11 wherein said flow deflector is formed as a stamping.

13. A condenser as set forth in claim 1 wherein said manifold has a side forming a planar portion having a slot extending axially, an arcuate portion extending from said planar portion with a side edge disposed in said slot to form said interior chamber, and a passageway portion extending from said planar portion with a side edge disposed in said slot to form one of said first fluid passageway and said second fluid passageway.

14. A condenser as set forth in claim 13 wherein said side is formed as a stamping.

15. A condenser for an air conditioning system of a motor vehicle comprising:

a plurality of generally U-shaped fluid carrying tubes having free ends;

a manifold having a plurality of tubular members matingly engaging said free ends of said tubes and an interior chamber therein; and said manifold including a receiver dryer disposed in said interior chamber and having a first fluid conduit wall and a second conduit wall extending axially to form a generally parallel first fluid passageway and second fluid passageway in fluid communication with said tubes and a dryer capsule having dryer material therein being disposed in said interior chamber to dry fluid in said manifold.

16. A condenser as set forth in claim 15 wherein said manifold has a side with a planar portion, an arcuate portion attached to said planar portion and forming said interior chamber, and a passageway portion attached to said planar portion and forming one of said first fluid passageway and said second fluid passageway.

17. A condenser as set forth in claim 16 including a flow deflector disposed in said interior chamber and secured to said side to form the other one of said first fluid passageway and said second passageway.

18. A condenser as set forth in claim 15 wherein said manifold comprises a first housing and a second housing, said first housing having a pair of slots and said second housing having a pair of side edges to be received in said slots.

19. A condenser as set forth in claim 15 wherein said first fluid conduit wall and said second fluid conduit wall are extruded as one-piece.

20. A condenser as set forth in claim 15 wherein said dryer capsule comprises a base, a housing extending from said base to house said dryer material, at least one aperture extending through said base and a filter extending from said base and fluidly communicating with said at least one aperture.

\* \* \* \* \*